(12) United States Patent
Lee et al.

(10) Patent No.: US 9,359,462 B2
(45) Date of Patent: Jun. 7, 2016

(54) MODIFIED HIGH CIS BUTADIENE-ISOPRENE COPOLYMER, METHOD FOR PRODUCING THE SAME AND TIRE HAVING AFOREMENTIONED POLYMER

(71) Applicant: Chi Mei Corporation, Tainan (TW)

(72) Inventors: Chih-Cheng Lee, Tainan (TW); Hung-Jui Kuo, Tainan (TW)

(73) Assignee: CHI MEI CORPORATION, Tainan (TW)

( * ) Notice: Subject to any disclaimer, the term of this patent is extended or adjusted under 35 U.S.C. 154(b) by 0 days.

(21) Appl. No.: 14/564,200

(22) Filed: Dec. 9, 2014

(65) Prior Publication Data
US 2015/0166707 A1   Jun. 18, 2015

(30) Foreign Application Priority Data
Dec. 13, 2013 (TW) .............. 102146284 A

(51) Int. Cl.
*C08F 236/08* (2006.01)
*C08F 236/06* (2006.01)
*B60C 1/00* (2006.01)
*C08C 19/25* (2006.01)
*C08C 19/44* (2006.01)

(52) U.S. Cl.
CPC ............ *C08F 236/08* (2013.01); *B60C 1/00* (2013.01); *C08C 19/25* (2013.01); *C08C 19/44* (2013.01); *C08F 236/06* (2013.01); *C08F 2410/01* (2013.01); *C08G 2261/21* (2013.01); *C08G 2261/726* (2013.01)

(58) Field of Classification Search
None
See application file for complete search history.

(56) References Cited

U.S. PATENT DOCUMENTS

| | | | |
|---|---|---|---|
| 3,297,667 A | 1/1967 | von Dohlen et al. | |
| 3,794,604 A | 2/1974 | Throckmorton et al. | |
| 4,520,177 A | 5/1985 | Jenkins | |
| 4,544,718 A | 10/1985 | Yeh et al. | |
| 4,843,120 A * | 6/1989 | Halasa | B60C 1/0016 152/450 |
| 5,064,910 A | 11/1991 | Hattori et al. | |
| 5,220,045 A | 6/1993 | Knauf et al. | |
| 5,405,815 A * | 4/1995 | Bell | C08F 236/04 502/102 |
| 6,075,092 A | 6/2000 | Nakamura et al. | |
| 6,992,147 B1 | 1/2006 | Ozawa et al. | |
| 7,115,693 B2 * | 10/2006 | Laubry | C08F 236/04 526/153 |
| 8,101,671 B2 | 1/2012 | Kanae et al. | |
| 8,674,030 B2 | 3/2014 | Lee et al. | |
| 2005/0176886 A1 * | 8/2005 | Jang | C08C 19/44 525/63 |
| 2006/0030677 A1 | 2/2006 | Ozawa et al. | |
| 2011/0112212 A1 | 5/2011 | Kimura et al. | |
| 2013/0158205 A1 * | 6/2013 | Lee et al. | 525/333.1 |

FOREIGN PATENT DOCUMENTS

| | | |
|---|---|---|
| EP | 1449857 A1 | 8/2004 |
| EP | 1479698 A1 | 11/2004 |
| TW | 200804486 A | 1/2008 |
| TW | 201326226 A1 | 7/2013 |
| WO | 9739055 | 10/1997 |
| WO | 2009072650 | 6/2009 |

OTHER PUBLICATIONS

TW Office Action Jul. 1, 2013.

* cited by examiner

*Primary Examiner* — Marc Zimmer
(74) *Attorney, Agent, or Firm* — McClure, Qualey & Rodack, LLP

(57) ABSTRACT

A modified high cis butadiene-isoprene copolymer, a method for producing the same, and a tire having the aforementioned polymer are provided. The method includes performing a polymerization step for forming a high cis butadiene-isoprene copolymer having an organometallic active site and reacting which copolymer with a modifier mixture via the organometallic active site for forming the modified high cis butadiene-isoprene copolymer. The modifier mixture comprises a first modifier and a second modifier. The first modifier has a chemical formula of $X-R1-Si(R2)_3$, wherein X is an glycidoxy functional group, an isocyanate functional group, or a 2-(3,4-epoxycyclohexyl group), R1 is an alkylene group, and R2 is an alkyl group or an alkoxy group. The second modifier has a chemical formula of $R3-Si(R4)_3$, wherein R3 is an alkoxy group or an aryloxy group, and R4 is an alkyl group, an alkoxy group, an aryloxy group or a cycloalkyl group.

7 Claims, No Drawings

MODIFIED HIGH CIS BUTADIENE-ISOPRENE COPOLYMER, METHOD FOR PRODUCING THE SAME AND TIRE HAVING AFOREMENTIONED POLYMER

This application claims the benefit of Taiwan application Serial No. 102146284, filed on Dec. 13, 2013, the subject matter of which is incorporated herein by reference.

BACKGROUND OF THE INVENTION

1. Field of the Invention

The present invention relates to a copolymer and a method for producing the same, and more particularly to a modified high cis butadiene-isoprene copolymer, a method for producing the same, and an application thereof.

2. Description of the Related Art

Conjugated diene polymer is widely used for resin modifying applications and various industrial goods, of which one is for manufacturing tires. Demands for low fuel consumption and wear loss for the tires have increased with increasing environmental consciousness in recent years. For conforming the demand trend, the rolling resistance property, the wet traction property, the tensile strength property, and etc. of mechanical characteristics of the conjugated diene polymer are very important.

Conjugated diene polymer having high content of cis-1,4 structure has good mechanical characteristics. Therefore are many conventional methods for manufacturing the conjugated diene polymer having high content of cis-1,4 structure. In those methods, catalysts formed of a combination of a metal compound, such as a Ni series compound, a Ti series compound, a Co series compound, a La series compound, etc., and an organic aluminum compound are usually used.

Currently, carbon black is added to conjugated diene polymer to increase the strength of the tires. In recent years, due to the depletion of oil resource and the global warming issue, many methods of replacing carbon black with silica as reinforcing filler have been provided. In comparison with carbon black, silica is more difficult to be uniformly distributed in conjugated diene polymer. Therefore, the compatibility between silica and conjugated diene polymer needs to be further increased. According to one improvement method, when adding silica to conjugated diene polymer during the manufacturing process of tires, a modifier is used for performing blending. However, since the blending uniformity largely affects the properties of the products, product quality may differ from batch to batch, and quality reproducibility is poor. Moreover, it is hard to make sure if the conjugated diene polymer is modified by the modifier, or the modifier only reacts with silica. Therefore, how to provide a conjugated diene polymer with silica well distributed therein and a method for manufacturing the same has become a prominent task for the industries.

SUMMARY OF THE INVENTION

The present invention relates to a modified high cis butadiene-isoprene copolymer and a method for producing the same. According to the embodiments, the modified high cis butadiene-isoprene copolymer has excellent mechanical properties, which can be used in manufacturing tires and satisfies the energy needs of the markets.

According to an embodiment of the present invention, a method for producing a modified high cis butadiene-isoprene copolymer is provided. The method includes performing a polymerization step for forming a high cis butadiene-isoprene copolymer having an organometallic active site, wherein the organometallic active site is formed of an organometallic catalytic system, the organometallic catalytic system comprising: rare earth metal-organic carboxylate, organoaluminum compound having a formula of $AlR_3$ or $HAlR_2$, wherein R is alkyl group with 1~8 carbon atoms, and halogen donor comprising alkylaluminum halide; and reacting the high cis butadiene-isoprene copolymer having the organometallic active site with a modifier mixture via the organometallic active site for forming the modified high cis butadiene-isoprene copolymer. The modifier mixture comprises a first modifier and a second modifier. The first modifier has a chemical formula of X—R1-Si(R2)$_3$, wherein X is an glycidoxy functional group, an isocyanate functional group, or a 2-(3,4-epoxycyclohexyl group), R1 is an alkylene group with 2~3 carbon atoms, and R2 is an alkyl group with 2~3 carbon atoms or an alkoxy group with 1~3 carbon atoms. The second modifier has a chemical formula of R3-Si(R4)$_3$, wherein R3 is an alkoxy group or an aryloxy group with 1~12 carbon atoms, and R4 is an alkyl group, an alkoxy group, an aryloxy group or a cycloalkyl group with 1~12 carbon atoms.

The high cis butadiene-isoprene copolymer contains a butadiene structure unit from 60% to 95%, and a mole ratio of the first modifier to the second modifier is 0.1:1~10:1.

The mole ratio of the first modifier to the second modifier is preferably 1:1~5:1.

The butadiene structure unit in the high cis butadiene-isoprene copolymer is from 30% to 60%, and the mole ratio of the first modifier to the second modifier is 1:1 to 5:1.

The butadiene structure unit in the high cis butadiene-isoprene copolymer is 5~30%, and the mole ratio of the first modifier to the second modifier is 0.1:1~1:1.

The polymerization step is performed under the organometallic catalytic system, wherein the first modifier comprises at least one selected from the group consisting of 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, methyl(3-glycidoxypropyl)dimethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyl(methyl)dimethoxysilane, 3-isocyanatopropyltrimethoxysilane, 3-isocyanatopropyltriethoxysilane, 3-isocyanatopropylmethyldiethoxysilane, 3-isocyanatopropyltriisopropoxysilane, and a combination thereof.

The second modifier comprises at least one selected from the group consisting of tetramethoxysilane, tetraethoxysilane, tetrapropoxysilane, tetrabutoxysilane, methyl(trimethoxy)silane, methyl(triethoxy)silane, methyl(tripropoxy)silane, ethyl(trimethoxy)silane, ethyl(triethoxy)silane, ethyl(tripropoxy)silane, propyl(trimethoxy)silane, propyl(triethoxy)silane, propyl(tripropoxy)silane, butyl(trimethoxy)silane, butyl(triethoxy)silane, butyl(tripropoxy)silane, phenyl(tri-methoxy)silane, phenyl(tri-ethoxy)silane, phenyl(tripropoxy)silane, phenyl(tri-n-butoxy)silane, dimethyldimethoxysilane, diethyldiethoxysilane, methylphenyl(dimethoxy)silane, methylphenyl(diethoxy)silane, dicyclohexyl(diphenoxy)silane, didecyl(didecoxy)silane, tetradodecoxysilane, tetraphenoxysilane, and a combination thereof.

According to another embodiment of the present invention, a modified high cis butadiene-isoprene copolymer is provided. The modified high cis butadiene-isoprene copolymer is produced by any one of the aforementioned methods.

The modified high cis butadiene-isoprene copolymer, wherein butadiene structure units and isoprene structure units in the modified high cis butadiene-isoprene copolymer contain more than 97% of a cis-1,4-structure, and a polydispersity index (PDI) of the modified high cis butadiene-isoprene copolymer is greater than 1.5 and less than 2.7.

In the modified high cis butadiene-isoprene copolymer, a content ratio of aluminum to neodymium is 1:1 to 5:1.

According to a further embodiment of the present invention, a tire is provided. The tire comprises the modified high cis butadiene-isoprene copolymer produced by any one of the aforementioned methods.

BRIEF DESCRIPTION OF THE DRAWINGS

None.

DETAILED DESCRIPTION OF THE INVENTION

According to the embodiments of the present invention, a modified high cis butadiene-isoprene copolymer, a method for producing the same, and a tire having the aforementioned polymer are provided. The method includes performing a polymerization step for forming a high cis butadiene-isoprene copolymer having an organometallic active site. And then, let the high cis butadiene-isoprene copolymer having the organometallic active site react with a modifier mixture via the organometallic active site for forming the modified high cis butadiene-isoprene copolymer.

In the embodiment, the modified high cis butadiene-isoprene copolymer has butadiene structure units and isoprene structure units, these units have a cis-1,4-structure of higher than 97%, and a polydispersity index (PDI) of the modified high cis butadiene-isoprene copolymer is greater than 1.5 and less than 2.7. The modified high cis butadiene-isoprene copolymer has such as 120-400 ppm of neodymium (Nd), and a content ratio of aluminum (Al) to Nd is 1:1 to 5:1, preferably, 2:1 to 4:1.

In the embodiments, the modifier mixture comprises a first modifier and a second modifier.

In one embodiment, when the butadiene structure unit content in the high cis butadiene-isoprene copolymer is 60~95%, the mole ratio of the first modifier to the second modifier is 0.1:1~10:1, preferably, 1:1~5:1.

In another embodiment, when the butadiene structure unit content in the high cis butadiene-isoprene copolymer is 30~60%, the mole ratio of the first modifier to the second modifier is 1:1~5:1.

In a further embodiment, when the butadiene structure unit content in the high cis butadiene-isoprene copolymer is 5~30%, the mole ratio of the first modifier to the second modifier is 0.1:1~1:1.

The first modifier has a chemical formula of X—R1-Si (R2)$_3$, wherein X is an glycidoxy functional group, an isocyanate functional group, or a 2-(3,4-epoxycyclohexyl group), R1 is an alkylene group with 2-3 carbon atoms, and R2 is an alkyl group with 2-3 carbon atoms or an alkoxy group with 1-3 carbon atoms.

In the embodiment, the first modifier comprises at least one selected from the group consisting of 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, methyl(3-glycidoxypropyl)dimethoxysilane, 2-(3,4-epoxycyclohexyl) ethyltrimethoxysilane, 2-(3,4-epoxycyclohexyl) ethyltriethoxysilane, 2-(3,4-epoxycyclohexyl)ethyl(methyl) dimethoxysilane, 3-isocyanatopropyltrimethoxysilane, 3-isocyanatopropyltriethoxysilane, 3-isocyanatopropylmethyldiethoxysilane, 3-isocyanatopropyltriisopropoxysilane, and a combination thereof.

The second modifier has a chemical formula of R3-Si (R4)$_3$, wherein R3 is an alkoxy group or an aryloxy group with 1~12 carbon atoms, and R4 is an alkyl group, an alkoxy group, an aryloxy group or a cycloalkyl group with 1~12 carbon atoms.

In the embodiment, the second modifier comprises at least one selected from the group consisting of tetramethoxysilane, tetraethoxysilane, tetrapropoxysilane, tetrabutoxysilane, methyl(trimethoxy)silane, methyl(triethoxy)silane, methyl (tripropoxy)silane, ethyl(trimethoxy)silane, ethyl(triethoxy) silane, ethyl(tripropoxy)silane, propyl(trimethoxy)silane, propyl(triethoxy)silane, propyl(tripropoxy)silane, butyl(trimethoxy)silane, butyl(triethoxy)silane, butyl(tripropoxy)silane, phenyl(tri-methoxy)silane, phenyl(tri-ethoxy)silane, phenyl(tripropoxy)silane, phenyl(tri-n-butoxy)silane, dimethyldimethoxysilane, diethyldiethoxysilane, methylphenyl (dimethoxy)silane, methylphenyl(diethoxy)silane, dicyclohexyl(diphenoxy)silane, didecyl(didecoxy)silane, tetradodecoxysilane, tetraphenoxysilane, and a combination thereof.

The polymerization step may be performed under an organometallic catalytic system. In the present invention, the organometallic catalytic system may be formed from a rare earth metal compound with the rare earth metal having an atomic number of 57-71 in the element periodic table, an organoaluminum compound, a halogen donor, and/or a conjugated diene monomer. Moreover, the organometallic catalytic system may further include an aluminoxane material.

In the present invention, the rare earth metal is preferably Nd, praseodymium (Pr), cerium (Ce), lanthanum (La), germanium (Ge), etc., or a mixture of these elements. The above-mentioned compounds of the rare earth metal are preferably salts that are soluble in a solvent, such as organic carboxylate, alkoxides, β-diketone complexes, phosphates, and phosphites of rare earth metals, preferably rare earth metal-organic carboxylate.

In the present invention, organic carboxylate may include alkyl group, alkenyl group, or phenyl group with linear, branch, or cyclic structures. The carboxylic site is not limited to be at the primary carbon, and the carboxylic site may be at the secondary carbon or the tertiary carbon. For example, the carboxylic site may be the carboxylic site of octanoic acid, 2-ethylhexanoic acid, oleic acid, neodecanoic acid (such as Versatic acid provided by Shell Company), stearic acid, naphthenic acid, or benzoic acid. Alkoxides may be formed from at least one of 2-ethyl-hexylalkoxy group, oleylalkoxy group, stearylalkoxy group, phenoxy group, benzylalkoxy group, and etc. β-diketone complexes may be formed from at least one of acetylacetone complex, benzoylacetone complex, propionitrileacetone complex, valerylacetone complex, and ethylacetylacetone complex. Phosphates and phosphites may be independently formed from at least one of bis(2-ethylhexyl) phosphate, bis(1-methylheptyl)phosphate, bis(p-nonylphenyl)phosphate, bis(polyethylene glycol-p-nonylphenyl) phosphate, bis(1-methylheptyl)(2-ethylhexyl)phosphate, bis (2-ethylhexyl)(p-nonylphenyl)phosphate, mono-2-ethylhexyl 2-ethylhexylphosphonate, mono-p-nonylphenyl 2-ethylhexylphosphonate, bis(2-ethylhexyl)phosphinic acid, bis(1-methylheptyl)phosphinic acid, bis(p-nonylphenyl) phosphinic acid, bis(1-methylheptyl)(2-ethylhexyl)phosphinic acid, and bis(2-ethylhexyl)(p-nonylphenyl)phosphinic acid.

Examples of the rare earth metal compound may include salts such as neodymium trichloride, didymium trichloride (formed from 72 wt % of neodymium, 20 wt % of lanthanum, and 8 wt % of praseodymium). In the embodiment, the rare earth metal-organic carboxylate is such as lanthanide series metal organic carboxylate. The lanthanide series metal organic carboxylate comprises, for example, neodymium 2-ethylhexanoate, didymium 2-ethylhexanoate, neodymium naphthenate, neodymium 2,2-diethylhexanoate, neodymium trimethacrylate, polymer of neodymium trimethacrylate, neodymium neodecanoate, and a combination thereof.

In the embodiment, the organoaluminum compound is composed of an aluminium alkyl having a molecular formula of $AlR_3$, $HAlR_2$ or $RAlH_2$, wherein R is alkyl group with 1~8 carbon atoms. The organoaluminum compound comprises at least one of trimethylaluminum, triethyl aluminum, triisopropylaluminum, tributylaluminum, triisobutylaluminum, trihexylaluminum, tricyclohexylaluminum, tri-n-octyl aluminum, diethylaluminum hydride, dipropylaluminum hydride, dibutylaluminum hydride, di-isobutyl aluminum hydride (DIBAH), ethylaluminum dihydride, propylaluminum dihydride, isobutylaluminum dihydride, or any combinations thereof.

In the embodiment, the halogen donor includes an alkylaluminum halide, which may have a structural formula of $R'AlCl_2$, $R'_3Al_2Cl_3$ or $R'_2AlCl$, etc., wherein R' is a hydrocarbon group with 8~12 carbon atoms. For example, the halogen donor comprises dimethylaluminum chloride, diethylaluminum chloride, di-isobutyl aluminum chloride (DIBAC), dioctylaluminum chloride, ethylaluminum sesquichloride, ethylaluminum dichloride, dibutylaluminum chloride or a correspondent alkylaluminum bromide or alkylaluminum iodide thereof. In addition to the rare earth metal-organic carboxylates, organoaluminum compounds, and halogen donors, the description of U.S. Pat. No. 3,297,667 and U.S. Pat. No. 3,794,604 are incorporated herein by reference.

In the embodiment, the organometallic catalytic system is preferably composed of another isoprene or conjugated diene monomer, rare earth metal-organic carboxylate, organoaluminum compound, and halogen donor. Specifically speaking, a small amount of another isoprene or conjugated diene monomer, other than performing the polymerization for forming the high cis butadiene-isoprene copolymer, may be added into the organometallic catalytic system to increase the catalytic activity of the organometallic catalytic system and decreased the inducing time for the organometallic catalytic system during the polymerization process. In other words, the organometallic active site of the high cis butadiene-isoprene copolymer is composed of the organometallic catalytic system. In addition, the time point at which the another isoprene or conjugated diene monomer is added is not limited, and the addition can be at any time point when organometallic catalytic materials (e.g. rare earth metal-organic carboxylate, organoaluminum compound, and halogen donor) are added. Moreover, the amount of the isoprene monomer may be based on the rare earth metal-organic carboxylate; that is, a ratio of the mole of the rare earth metal-organic carboxylate to the mole of the isoprene monomer is 1:0~1:1000, preferably 1:0.5~1:500, more preferably 1:2~1:100.

In the embodiment, the high cis butadiene-isoprene copolymer is mainly (higher than 95%) formed by copolymerizing butadiene monomers and isoprene monomers, wherein the formed copolymer contains 95% of higher of butadiene structure units and isoprene structure units. Specifically speaking, the copolymerization may include less than 5% of other conjugated diene monomers, such as 2-phenylbutadiene, 2,3-dimethylbutadiene, 1,3-hexadiene, 1,3-octadiene, or any combinations thereof. Therefore, the obtained high cis butadiene-isoprene copolymer may contain less than 5% of the structure units composed of the other conjugated diene monomers. That is, the above-mentioned butadiene structure units and isoprene structure units refer to the repeating structure units of the copolymerized butadiene monomers and copolymerized isoprene monomers, respectively, in the unmodified high cis butadiene-isoprene copolymer.

In the embodiment, the process temperature for the rare earth metal-organic carboxylate, organoaluminum compound, and halogen donor is controlled according to a melting point and a boiling point of the solvent, to be −20° C.~120° C. preferably. The above-mentioned catalytic materials may be added respectively. Preferably, after the rare earth metal-organic carboxylate and the organoaluminum compound are added, the halogen donor is added. In some cases where needed, the organoaluminum compound and the rare earth metal-organic carboxylate may be mixed together before the polymerization step.

According to the embodiments of the present invention, when preparing the solution of the organometallic catalytic system, a small amount of the conjugated diene monomer may be added, such that a catalytic activity of the catalytic system is increased, and an inducing time for the catalytic system during the polymerization process is decreased. The time point when the conjugated diene monomer is added can be any time points when each one of the catalytic materials is added.

In a first embodiment, in the to-be-modified high cis butadiene-isoprene copolymer, the butadiene structure units and isoprene structure units have a cis-1,4-structure of higher than 97%. Ratios between the each of the organometallic catalytic materials of the organometallic catalytic system need to be limited for obtaining a high cis conversion ratio for the copolymerization of butadiene monomers and isoprene monomers for the high cis structure. Specifically speaking, the ratio of the mole of rare earth metal-organic carboxylate to the total mole of the organoaluminum compound and the halogen donor is 1:1.5~1:100, preferably 1:1.5~1:60. The ratio of the mole of rare earth metal-organic carboxylate to the mole of the halogen donor is controlled to be 1:0.5~1:10 preferably.

In the embodiments, in the step of polymerizing the conjugated diene monomers, the conjugated diene monomers may be pumped into a reaction tank before or after the organometallic catalytic system is added, or between timings of adding one catalytic material of the organometallic catalytic system and another catalytic material of the organometallic catalytic system. The amount of conjugated diene monomers may be added only once, or added by fractional steps. In the embodiments, the reaction tank is equipped with a stirrer preferably. One reaction tank or a plurality of reaction tanks connected in series may be used. A batch feeding method is preferable.

The copolymerization reaction of conjugated diene monomers may be performed with a proper amount of a solvent. The solvent may be an inert hydrocarbon compound, including an aliphatic hydrocarbon, an alicyclic hydrocarbon, an aromatic hydrocarbon, a mono olefin, or a combination thereof. The hydrocarbon compound includes an aliphatic hydrocarbon compound with 4~8 carbon atoms, an alicyclic hydrocarbon compound with 5~10 carbon atoms, an aromatic hydrocarbon compound with 6~9 carbon atoms, a mono olefin with 4~8 carbon atoms, or a combination thereof. The examples of the above-mentioned hydrocarbon compound may include butane, pentane, hexane, heptane, cyclopentane, cyclohexane, benzene, toluene, xylene, 1-butene, and 1-pentene but not limited thereto. In the embodiments, the polymerization is preferably performed in a solvent without any aromatic hydrocarbon; that is, the polymerization is performed in a hydrocarbon selected from the group consisting of an aliphatic hydrocarbon compound with 4~8 carbon atoms, an alicyclic hydrocarbon compound with 5~10 carbon atoms, a mono olefin with 4~8 carbon atoms, or a combination thereof, which is because that the organometallic catalytic system performs a greater catalytic activity in the solvent. The inert hydrocarbon for the solvent is preferably selected from hexane and cyclohexane.

A variety of agents or additives commonly used in rubber industry can be added to the modified high cis butadiene-isoprene copolymer of the present invention according to needs for forming rubber compositions of high cis butadiene-isoprene copolymer. The agents or additives include fillers, antioxidants, coupling agents, vulcanization assistants, vulcanizing agents, antiozonants, process oils, and etc.

In the present description, the term of "phr (parts per hundred rubber)" is used as the units of the amount of addition, which is a common terminology in the rubber production field. "phr" indicates "the part by weight of addition based on the weight of the rubber regarded as 100 parts by weight", and "rubber" indicates the high cis butadiene-isoprene copolymer.

The fillers may be carbon black. Based on the weight of the rubber regarded as 100 parts by weight, the amount of carbon black may be 10 to 100 parts by weight, preferably 20 to 90 parts by weight.

The antioxidants include phenolic compound with a hindered phenol functional group (e.g. lx-1076 made by CIBA Company), dialkylphenyl triphosphate antioxidant, aminated antioxidant such as naphthylamine, diphenylamine, p-phenylenediamine, phenol antioxidant such as trialkyl phenol, hydroquinone, polyphenol, or a combination thereof. Based on the weight of the rubber regarded as 100 parts by weight, the amount of the antioxidant may be 0.2 to 1 parts by weight.

The coupling agents include bis-(3-triethoxysilylpropyl) tetrasulfide, bis-(3-triethoxysilylpropyl)disulfide, bis-(2-triethoxysilylethyl)tetrasulfide, 3-mercaptopropyltriethoxysilane, 3-triethoxysilyl propyl-N,N-dimethylthiocarbamoyl tetrasulfide, 3-triethoxysilylpropyl benzothiazole tetrasulfide, or the like. Based on the weight of the rubber regarded as 100 parts by weight, the amount of the coupling agent may be 1 to 15 parts by weight, preferably 5 to 10 parts by weight.

The vulcanization assistants include vulcanization activators and vulcanization accelerators.

The vulcanization activators may be such as zinc oxides or stearic acids.

The vulcanization accelerators may be mercapto-benzthiazoles, sulfenamides, guanidines, dithiocarbamates, thioureas, or thiocarbonates.

The vulcanization accelerators preferably are sulfenamide accelerators, wherein the sulfenamide accelerators are such as cyclohexylbenzothiazole-sulfenamide, dicyclohexylbenzothiazole-sulfenamide, butylbenzo-thiazolesulfenamide, or a combination thereof. More preferably, the vulcanization accelerators are N-cyclohexyl-2-benzo thiazolesulfenamide (CBS), diphenyl guanidine (DPG), or a combination thereof.

The vulcanizing agents are such as sulfur donors or organic sulfur donors. Based on the weight of the rubber regarded as 100 parts by weight, the total amount of the vulcanization assistant and the vulcanizing agent may be 0.1 to 15 parts by weight, wherein the vulcanization assistant includes the vulcanization activator and the vulcanization accelerator, preferably 0.5 to 5 parts by weight.

The antiozonants are such as N-(1,3-Dimethylbutyl)-N'-phenyl-p-phenylenediamine (6PPD). Based on the weight of the rubber regarded as 100 parts by weight, the amount of the antiozonant may be 1 to 10 parts by weight.

According to a third embodiment of the present invention, a tire including any of the aforementioned modified high cis butadiene-isoprene copolymer is provided. Specifically speaking, the tire can be manufactured from the rubber composition formed by mixing any of the aforementioned modified high cis butadiene-isoprene copolymer with the aforementioned agents or additives including fillers, antioxidants, coupling agents, vulcanization assistants such as vulcanization activator and the vulcanization accelerator, vulcanizing agents, antiozonant, process oils, and etc.

A number of embodiments are disclosed below to provide detailed descriptions of the disclosure.

<Catalyst Composition Preparation I>

0.162 mole of neodymium neodecanoate, 1.296 mole of di-isobutyl aluminum hydride (DIBAH) and 0.486 mole of diethylaluminum chloride (DEAC) are mixed using n-hexane as a solvent at room temperature. The mass content of Nd element is 0.26 wt % of the catalyst composition. The molar ratio of neodymium neodecanoate to the total mole of the diethylaluminum chloride and the di-isobutyl aluminum hydride is 1:11. The molar ratio of neodymium neodecanoate to diethylaluminum chloride is controlled to be 1:3.

<Catalyst Composition Preparation II>

0.162 mole of neodymium neodecanoate, 1.296 mole of tri-isobutyl aluminum hydride (TIBA) and 0.3726 mole of diethylaluminum chloride (DEAC) are mixed using n-hexane as a solvent at room temperature. The mass content of Nd element is 0.26 wt % of the catalyst composition. The mole of neodymium neodecanoate:the total mole of the diethylaluminum chloride and the tri-isobutyl aluminum hydride is 1:10.3. The mole of neodymium neodecanoate:the mole of diethylaluminum chloride is controlled to be 1:2.3.

<Modified High Cis Butadiene-Isoprene Copolymer>

Methods for producing the modified high cis conjugated butadiene-isoprene copolymers in embodiments 1~12 and for polymers in comparative embodiments 1~4 are similar, and the main differences between which are the molar ratios of butadiene to isoprene (the mole of butadiene/the mole of isoprene) and the molar ratios of the first modifier to the second modifier (the mole of the first modifier/the mole of the second modifier), as shown in Table 1. In embodiments 1~12, 3-glycidoxypropyltrimethoxysilane (GPMOS) is used as the first modifier, and TEOS is used as the second modifier.

The method for producing the modified high cis butadiene-isoprene copolymer is illustrated below using embodiment 2 as example.

In the method for producing the modified high cis butadiene-isoprene copolymer in embodiment 2, 60.2 kg of n-hexane is poured into the reaction tank, and the temperature of the reaction tank is set to be heated to 40° C. After 10 kg of 100% butadiene and 5 kg of n-hexane having 40% of isoprene is poured into the reaction tank, 2 kg of n-hexane is poured into the reaction tank. Next, 1333 g of the catalyst composition having 0.26 wt % of Nd prepared in the step of <CATALYST COMPOSITION PREPARATION II> is added into the reaction tank. After the temperature of the reaction tank reaches the highest point, 170 g of 10% GPMOS (first modifier) (170×10%/236.3=0.072 moles) and 50 g of 40% TEOS (second modifier) (50×10%/208.3=0.024 moles) are mixed and poured into the reaction tank. In other words, without damaging the activity of the organometallic active sites, the active sites of the high cis butadiene-isoprene copolymer are allowed to react with the above-mentioned modifier mixture and thus the modification is carried out. After the mixer is stirred for about 30 minutes, it is discharged. The solvent is the copolymer solution is removed, and the copolymer is dried. Therefore, the modified high cis butadiene-isoprene copolymer is obtained.

The method for comparative embodiment 1 is similar to that for embodiment 2 and different in that no isoprene is added for comparative embodiment 1. In the method for the modified high cis conjugated diene polymer in comparative embodiment 1, 60 kg of n-hexane is poured into the reaction tank, and the temperature of the reaction tank is set to be heated to 60° C. After 9 kg of % butadiene is poured into the reaction tank, 2 kg of n-hexane is poured into the reaction tank. Next, 900 g of the catalyst composition having 0.26 wt % of Nd prepared in the step of <CATALYST COMPOSITION PREPARATION I> is added into the reaction tank. After the mixer is stirred for about 30 minutes, 115 g of the first modifier KBM-403 (having the concentration 10% of 3-glycidoxypropyltrimethoxysilane, using n-hexane as the solvent) and 34 g of the second modifier TEOS (having the concentration 10% of tetraethoxysilane, using n-hexane as the solvent) are mixed and poured into the reaction tank. After the mixer is stirred for about 30 minutes, it is discharged. The solvent is the polymer solution is removed, and the polymer is dried. Therefore, the modified high cis conjugated diene polymer is obtained.

In comparative embodiment 2, natural rubber material is used in replace of butadiene and isoprene. This natural rubber material is analyzed by NMR to have close to 100% of the isoprene and used in the reaction without any modification.

In comparative embodiment 3, a mixture rubber having weight ratio of the material from comparative embodiment 1 to the material from comparative embodiment 2 equal to 80:20 is used.

In comparative embodiment 4, a mixture rubber having weight ratio of the material from comparative embodiment 1 to the material from comparative embodiment 2 equal to 50:50 is used.

Table 1 shows the compositions of feeding materials in embodiments 1~12 and comparative embodiments 1~2.

TABLE 1

|  | Butadiene (mol)/ isoprene (mol) | First modifier (mol)/ second modifier (mol) |
|---|---|---|
| Embodiment 1 | 83/16 | 1:3 |
| Embodiment 2 | 83/17 | 3:1 |
| Embodiment 3 | 83/17 | 10:1 |
| Embodiment 4 | 58/42 | 1:10 |
| Embodiment 5 | 58/42 | 3:1 |
| Embodiment 6 | 58/42 | 10:1 |
| Embodiment 7 | 42/58 | 1:3 |
| Embodiment 8 | 42/58 | 3:1 |
| Embodiment 9 | 42/58 | 10:1 |
| Embodiment 10 | 17/83 | 1:3 |
| Embodiment 11 | 17/83 | 3:1 |
| Embodiment 12 | 17/83 | 10:1 |
| Comparative embodiment 1 | 100/0 | 3:1 |
| Comparative embodiment 2 | 0/100 [Note 1] | N/A |

[Note 1]:
Obtained by NMR

Tables 2~3 show characteristics of the modified high cis butadiene-isoprene copolymers of embodiments 1~12 and of the polymers of comparative examples 1~4.

TABLE 2

|  | Cis-1,4 butadiene content (%) | Cis-1,4 isoprene content (%) | Isoprene content (by NMR) (%) | Cis-1,4 structure in total (%) |
|---|---|---|---|---|
| Embodiment 1 | 98.2 | 98.3 | 24.7 | 98.2 |
| Embodiment 2 | 98.4 | 98 | 24.7 | 98.3 |
| Embodiment 3 | 98.5 | 98 | 24.7 | 98.4 |
| Embodiment 4 | 98.3 | 98.5 | 42 | 98.4 |
| Embodiment 5 | 98.1 | 98.4 | 42 | 98.2 |
| Embodiment 6 | 98.2 | 98.5 | 42 | 98.3 |
| Embodiment 7 | 98.4 | 98 | 53.7 | 98.2 |
| Embodiment 8 | 98.6 | 98 | 53.7 | 98.3 |
| Embodiment 9 | 98.5 | 98.1 | 53.7 | 98.3 |
| Embodiment 10 | 98.3 | 97.5 | 76 | 97.7 |
| Embodiment 11 | 98.6 | 97 | 76 | 97.4 |
| Embodiment 12 | 98.7 | 97.7 | 76 | 97.9 |
| Comparative embodiment 1 | N/A | N/A | 100 | N/A |
| Comparative embodiment 2 | ~0 | N/A | ~0 | N/A |
| Comparative embodiment 3 | N/A | N/A | 20* | N/A |
| Comparative embodiment 4 | N/A | N/A | 50* | N/A |

*estimated from the mixing ratios obtained by IR.

Cis-1,4 structure in total (%) is calculated from the cis-1,4 butadiene content (%) and the cis-1,4 isoprene content (%).

TABLE 3

|  | Weight average molecular weight (ten thousand) | Number average molecular weight (ten thousand) | PDI (Mw/Mn) |
|---|---|---|---|
| Embodiment 1 | 65.2 | 30.1 | 2.17 |
| Embodiment 2 | 64.2 | 28.7 | 2.24 |
| Embodiment 3 | 69.0 | 24.2 | 2.85 |
| Embodiment 4 | 66.7 | 24.5 | 2.72 |
| Embodiment 5 | 60.7 | 26.8 | 2.27 |
| Embodiment 6 | 65.1 | 23.4 | 2.78 |
| Embodiment 7 | 62.2 | 21.0 | 2.96 |
| Embodiment 8 | 65.1 | 25.1 | 2.59 |
| Embodiment 9 | 67.3 | 23.4 | 2.87 |
| Embodiment 10 | 69.0 | 26.6 | 2.60 |
| Embodiment 11 | 70.3 | 30.3 | 2.32 |
| Embodiment 12 | 68.0 | 28.6 | 2.38 |
| Comparative embodiment 1 | N/A | N/A | N/A |
| Comparative embodiment 2 | N/A | N/A | N/A |
| Comparative embodiment 3 | N/A | N/A | N/A |
| Comparative embodiment 4 | N/A | N/A | N/A |

In Table 3, The polydispersity index (PDI) is obtained by dividing the weight average molecular weight by the number average molecular weight (Mw/Mn). The weight average molecular weight (Mw) and the number average molecular weight (Mn) are measured by using the weight average molecular weight obtained by the calibration obtained from the commercially available standard styrene, and using the GPC (Waters Company) having a differential refractive index detecting function and a light scattering detecting function.

<Rubber Composition>

The rubber composition is manufactured by using the modified high cis butadiene-isoprene copolymers of embodiments 1-12 and the polymers of comparative examples 1~4.

In the process for producing the rubber composition, following materials are used: Oil (#3, CPC Corporation of Taiwan), zinc oxide (ZnO, made by HA), carbon black (N330, made by China Steel Chemical Corporation), N-cyclohexyl-2-benzothiazolesulfenamide (CBS, made by FLEXSYS), and Sulfur (Triangle Brand).

The rubber compositions in embodiments 1~12 and comparative examples 1~4 are manufactured by the following method. After 736 g (100 phr) of the high cis butadiene-isoprene copolymer of the embodiment(s) or the polymer of the comparative embodiment(s) is blended for 1 minute, 3 phr of ZnO and 2 phr of stearic acid are added and blended for 2.5 minutes. After that, 60 phr of carbon black and 15 phr of oil are further added and blended for 4 minutes, and then the mixture is heavily pressed for 6 minutes. The above procedure is implemented by a BaNdury-type mixer. And then, the mixture is aged at room temperature for 0.5 hour. Then, 0.9 phr of N-tertiarybutyl-2-benzothiazole sulfennamide (TBBS) and 1.5 phr of sulfur are added, and a rubber composition is obtained accordingly. The above procedure is implemented with a Miller-type mixer at 40° C.

Characteristics of the rubber compositions are as shown in Tables 4~5.

tensile strength and the elongation at break of comparative embodiment 1 are set as 100, the tensile strengths index of other embodiments and comparative embodiments are calculated as Tsb index=(actual tensile strength of the embodiment or the comparative embodiment/actual tensile strength of comparative embodiment 1)×100%, and the elongation at break index of other embodiments and comparative embodiments are calculated as Elb index=(actual elongation at break of the embodiment or the comparative embodiment/actual elongation at break of comparative embodiment 1)×100%. According to the results as shown in Table 4, the rubber compositions of embodiments 8~12 have higher Tsb index than that of the rubber composition of comparative embodiment 1. That is, the high cis butadiene-isoprene copolymers having the ratio of feeding materials of butadiene/isoprene of about 17/83 and the high cis butadiene-isoprene copolymers having the molar ratio of first modifier/second modifier of 3:1~10:1 and the ratio of the feeding materials of butadiene/isoprene of about 42/58 are preferred.

Tear resistance is measured by the tensile strength analyzer (AGS-500G, made by SHIMADZU) according to ASTM

TABLE 4

| | Mooney viscosity (MU) | Tensile strength index (Tsb index) | 300% Modulus index | Elb index | Tear index | ΔE' index | Tanδ (60° C.) index |
|---|---|---|---|---|---|---|---|
| Embodiment 1 | 95 | 83 | 98 | 78 | 56 | 91 | 106 |
| Embodiment 2 | 92 | 88 | 108 | 81 | 82 | 89 | 116 |
| Embodiment 3 | 99 | 69 | 70 | 73 | 67 | 86 | 107 |
| Embodiment 4 | 68 | 99 | 70 | 118 | 92 | 91 | 104 |
| Embodiment 5 | 63 | 78 | 79 | 79 | 83 | 105 | 111 |
| Embodiment 6 | 67 | 95 | 96 | 92 | 89 | 98 | 89 |
| Embodiment 7 | 61 | 92 | 96 | 93 | 88 | 86 | 80 |
| Embodiment 8 | 61 | 107 | 93 | 106 | 98 | 103 | 112 |
| Embodiment 9 | 60 | 117 | 96 | 109 | 70 | 87 | 95 |
| Embodiment 10 | 60 | 127 | 96 | 111 | 105 | 87 | 104 |
| Embodiment 11 | 58 | 129 | 103 | 114 | 107 | 89 | 99 |
| Embodiment 12 | 59 | 128 | 106 | 114 | 104 | 86 | 99 |
| Comparative embodiment 1 | 62 | 100 | 100 | 100 | 100 | 100 | 100 |
| Comparative embodiment 2 | 49 | 165 | 97 | 137 | 119 | 85 | 94 |
| Comparative embodiment 3 | 57 | N/A | N/A | N/A | N/A | 95 | 90 |
| Comparative embodiment 4 | 57 | N/A | N/A | N/A | N/A | 87 | 97 |

In Table, the Mooney viscosity is measured by the MV-2000 equipment of Alpha Technology Inc. according to ASTM D-1646 method. The temperature for measuring is 100° C. The measuring time is 1+4 minutes. The characteristics of the rubber composition are analyzed by the dynamic mechanical analyzer (DMA Q800, made by TA Instruments).

The tensile strength (Tsb (kg/cm$^2$)) and the elongation at break (Elb (%)) are analyzed by ASTM D-412 DieC method. The tensile strength indicates the maximum strength that the test sample can bear during the elongation process. The measuring mode of tensile strength was a stretching mode, the stretching rate was 500 mm/min, and the temperature was set at room temperature by the tensile strength analyzer (AGS-500G, made by SHIMADZU). The elongation at break indicates the elongation percentage at break of the test sample as bearing the maximum strength. Elongation at break is the deformation level of the test specimen of the rubber composition at break point. The 300% Modulus indicates that strength needed for causing the deformation degree of 300% for the rubber composition.

In Table 4, the tensile strength is represented by Tsb index, and the elongation at break is represented by Elb index. The D624 DIE C method. Tear resistance indicates the maximum tear strength before the sample is torn. In Table 4, the tear resistance is represented by Tear index. The Tear index of comparative embodiment 1 is set as 100, and the tear resistance of other embodiments and comparative embodiments are calculated as Tear index=(actual tear resistance of the embodiment or the comparative embodiment/actual tear resistance of comparative embodiment 1)×100%. According to the results as shown in Table 4, the rubber compositions of embodiments 10~12 have higher Tear indexes than that of the rubber composition of comparative embodiment 1. That is, the high cis butadiene-isoprene copolymers having the ratio of feeding materials of butadiene/isoprene of about 17/83 are preferred.

When measuring the dynamic storage modulus of elasticity (E), the temperature is set at 60° C., the mode is set at tensile mode, the deformation degree of measurement is 0.5~10%, and the measurement frequency is 20 Hz. The dynamic storage modulus difference of elasticity (ΔE') can be obtained by deducting the dynamic storage modulus of elasticity measured when the deformation degree is 10% from the dynamic storage modulus of elasticity measured when the deformation degree is 0.5%. The smaller the value of the dynamic storage modulus difference of elasticity (ΔE') is, the better the compatibility between the rubber composition and carbon black and silica is. In Table 4, the dynamic storage modulus difference of elasticity is represented as the dynamic storage modulus difference of elasticity index (ΔE' index). The ΔE' index of comparative embodiment 1 is set as 100, and the ΔE' indexes of other embodiments and comparative embodiments are calculated as ΔE' index=(dynamic storage modulus difference of elasticity of comparative embodiment 1/dynamic storage modulus difference of elasticity of the embodiment or the comparative embodiment)×100%. From the results as shown in Table 4, it is found that the ΔE' indexes in embodiment 5, embodiment 8 are higher than the dynamic storage modulus difference of elasticity (ΔE') the ΔE' index of the rubber composition in comparative embodiment 1. In other words, the dynamic storage modulus difference of elasticity (ΔE') of the rubber composition in embodiment 5 or embodiment 8 is smaller than the dynamic storage modulus differences of elasticity (ΔE') of the rubber compositions in comparative embodiment 1. That is, the high cis butadiene-isoprene copolymers having the molar ratio of first modifier/second modifier of about 3:1 and the ratio of the feeding materials of butadiene/isoprene of about 58/42~42/58 are preferred.

The temperature rising rate is 3° C. per minute when measuring the loss tangent (tan δ), the loss tangent is measured at the temperature of 60° C., the mode is set at tensile mode, the deformation degree of measurement is 0.045%, and the measurement frequency is 20 Hz. At 60° C., the greater loss tangent indicates the greater rolling resistance of the rubber composition. In Table 4, the loss tangent is represented by Tan δ (60° C.) index. In Table 4, the Tan δ (60° C.) index of comparative embodiment 1 is set as 100, and the Tan δ (60° C.) indexes of other embodiments and comparative embodiments are calculated as Tan δ (60° C.) index=(loss tangent of comparative embodiment 1/loss tangent of the embodiment or the comparative embodiment)×100%. From the results as shown in Table 4, it is found that the Tan δ (60° C.) indexes of the rubber compositions in embodiments 2, 5 and 8 are higher than that of the rubber composition in comparative example 1. In other words, the loss tangent of the rubber compositions in embodiments 2, 5 and 8 are lower than that of the rubber composition in comparative example 1. That is, the high cis butadiene-isoprene copolymers having the molar ratio of first modifier/second modifier of about 3:1 are preferred.

TABLE 5

|  | Al content (ppm) | Nd content (ppm) | Al:Nd |
|---|---|---|---|
| Embodiment 1 | 891 | 290 | 3.07:1 |
| Embodiment 2 | 884 | 278 | 3.18:1 |
| Embodiment 3 | 877 | 285 | 3.08:1 |
| Embodiment 4 | 939 | 292 | 3.22:1 |
| Embodiment 5 | 951 | 288 | 3.30:1 |
| Embodiment 6 | 963 | 281 | 3.43:1 |
| Embodiment 7 | 953 | 297 | 3.21:1 |
| Embodiment 8 | 966 | 309 | 3.13:1 |
| Embodiment 9 | 959 | 310 | 3.09:1 |
| Embodiment 10 | 1001 | 392 | 2.55:1 |
| Embodiment 11 | 1084 | 378 | 2.87:1 |
| Embodiment 12 | 1053 | 383 | 2.75:1 |

Referring to Table 5, the contents of Al and Nd are measured by Inductively Coupled Plasma with Atomic Emission Spectroscopy (ICP-AES). 0.1~0.2 grams of the rubber composition is obtained, nitrated (with sulfuric acid and nitric acid), diluted, and then measured by the instrument. Table 5 shows the contents of Al (ppm), Nd (ppm), and the content ratio of Al to Nd. Since ppm indicates parts per million, having no units by itself, the content ratio of Al to Nd is Al (ppm):Nd (ppm).

In summary, a method for producing a modified high cis butadiene-isoprene copolymer is provided, by which a modified high cis butadiene-isoprene copolymer is manufactured. Accordingly, the modified high cis butadiene-isoprene copolymer is provided with great compatibility with carbon black and excellent physical characteristics, such as excellent tensile strength, tear resistance, and etc. As such, the modified high cis butadiene-isoprene copolymer is a great material for making tires with improved qualities and quantities.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for producing a modified high cis butadiene-isoprene copolymer, comprising:
performing a polymerization step for forming a high cis butadiene-isoprene copolymer having an organometallic active site, wherein the organometallic active site is formed of an organometallic catalytic system, the organometallic catalytic system comprising:
rare earth metal-organic carboxylate;
organoaluminum compound having a formula of $AlR_3$ or $HAlR_2$, wherein R is alkyl group with 1~8 carbon atoms; and
halogen donor comprising alkylaluminum halide; and
reacting the high cis butadiene-isoprene copolymer having the organometallic active site with a modifier mixture via the organometallic active site;
wherein the modifier mixture comprises a first modifier and a second modifier;
the first modifier has a chemical formula of X—R1-Si $(R2)_3$, wherein X is an glycidoxy functional group, an isocyanate functional group, or a 2-(3,4-epoxycyclohexyl group), R1 is an alkylene group with 2~3 carbon atoms, and R2 is an alkyl group with 2~3 carbon atoms or an alkoxy group with 1~3 carbon atoms; and
the second modifier has a chemical formula of $R3\text{-}Si(R4)_3$, wherein R3 is an alkoxy group or an aryloxy group with 1~12 carbon atoms, and R4 is an alkyl group, an alkoxy group, an aryloxy group or a cycloalkyl group with 1~12 carbon atoms; and
wherein the high cis butadiene-isoprene copolymer contains a butadiene structure unit and an isoprene structure unit, the high cis butadiene-isoprene copolymer contains the butadiene structure unit from 5% to 30%, and a mole ratio of the first modifier to the second modifier is 0.1:1 to 1:1.

2. The method for producing the modified high cis butadiene-isoprene copolymer according to claim 1, wherein the first modifier comprises at least one selected from the group consisting of 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, methyl(3-glycidoxypropyl)dimethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyl(methyl)dimethoxysilane, 3-isocyanatopropyltrimethoxysilane, 3-isocyanatopropyltriethoxysilane, 3-isocyanatopropylmethyldiethoxysilane, 3-isocyanatopropyltriisopropoxysilane, and a combination thereof.

3. The method for producing the modified high cis butadiene-isoprene copolymer according to claim 1, wherein the second modifier comprises at least one selected from the group consisting of tetramethoxysilane, tetraethoxysilane, tetrapropoxysilane, tetrabutoxysilane, methyl(trimethoxy)silane, methyl(triethoxy)silane, methyl(tripropoxy)silane, ethyl(trimethoxy)silane, ethyl(triethoxy)silane, ethyl(tripropoxy)silane, propyl(trimethoxy)silane, propyl(triethoxy)silane, propyl(tripropoxy)silane, butyl(trimethoxy)silane, butyl(triethoxy)silane, butyl(tripropoxy)silane, phenyl(trimethoxy)silane, phenyl(tri-ethoxy)silane, phenyl(tripropoxy)silane, phenyl(tri-n-butoxy)silane, dimethyldimethoxysilane, diethyldiethoxysilane, methylphenyl(dimethoxy)silane, methylphenyl(diethoxy)silane, dicyclohexyl(diphenoxy)silane, didecyl(didecoxy)silane, tetradodecoxysilane, tetraphenoxysilane, and a combination thereof.

4. A modified high cis butadiene-isoprene copolymer, wherein the modified high cis butadiene-isoprene copolymer is produced by the method according to claim 1.

5. The modified high cis butadiene-isoprene copolymer according to claim 4, wherein butadiene structure units and isoprene structure units in the modified high cis butadiene-isoprene copolymer contain more than 97% of a cis-1,4-structure, and a polydispersity index (PDI) of the modified high cis butadiene-isoprene copolymer is greater than 1.5 and less than 2.7.

6. The modified high cis butadiene-isoprene copolymer according to claim 4, wherein in the modified high cis butadiene-isoprene copolymer, a content ratio of aluminum to neodymium is 1:1 to 5:1.

7. A tire, comprising the modified high cis butadiene-isoprene copolymer produced by the method according to claim 1.

* * * * *